May 1, 1934.                G. B. SCHLEICHER                1,957,232
                             COMPENSATING METER
                           Filed Sept. 30, 1931          4 Sheets-Sheet 1

Inventor
George B. Schleicher
By Augustus B. Stoughton.
Attorney

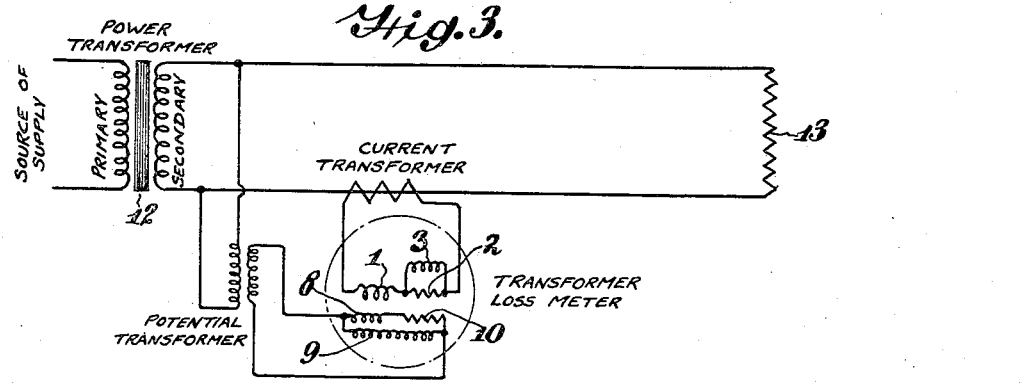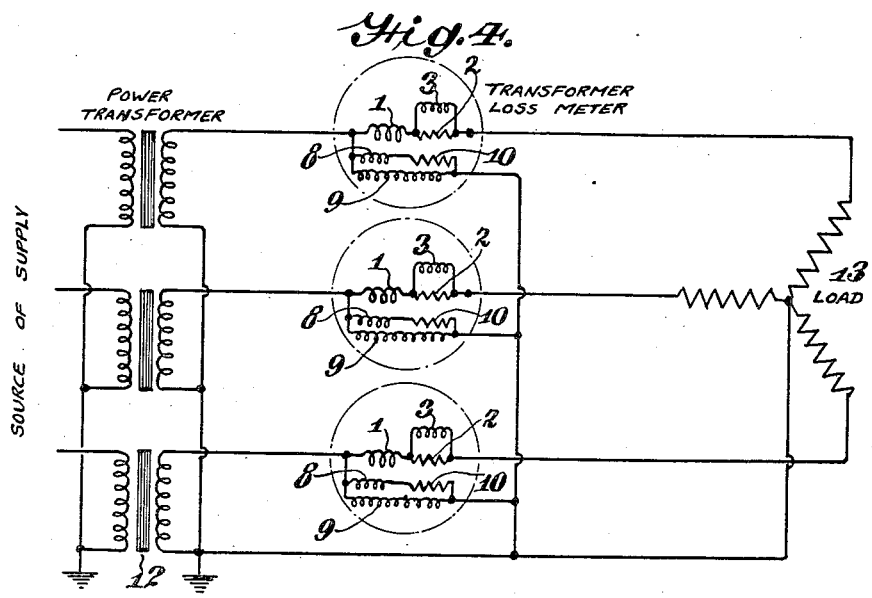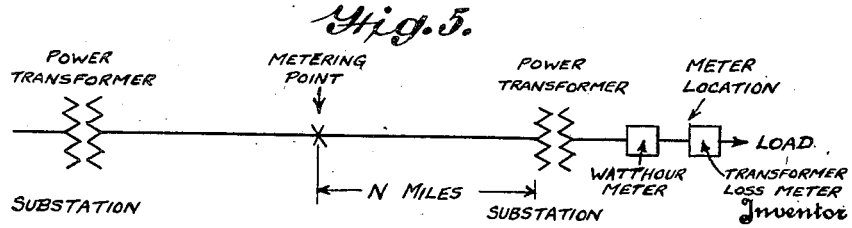

May 1, 1934.  G. B. SCHLEICHER  1,957,232
COMPENSATING METER
Filed Sept. 30, 1931  4 Sheets-Sheet 3

INVENTOR
George B. Schleicher,
BY
Augustus B Stoughton
ATTORNEY.

May 1, 1934.　　　G. B. SCHLEICHER　　　1,957,232
COMPENSATING METER
Filed Sept. 30, 1931　　　4 Sheets-Sheet 4

INVENTOR
George B. Schleicher.
BY
Augustus B. Stoughton.
ATTORNEY.

Patented May 1, 1934

1,957,232

UNITED STATES PATENT OFFICE 1,957,232

COMPENSATING METER

George B. Schleicher, Clementon, N. J.

Application September 30, 1931, Serial No. 565,937

17 Claims. (Cl. 175—183)

This invention relates to a system of measurement comprising an integrating and/or indicating measuring device for determining energy losses in power transformers used for supplying the customers of electrical utilities, transmission lines, distribution systems or substations or for other purposes.

In electrical metering practice it is often economically advisable to measure energy consumption on one side (either primary or secondary) of a transformer, and to add or subtract, as the case may require, a calculated value of transformer losses. Losses calculated on the basis of the average load give a value which is less than the true value if the load at times varies from the average; and when load variations are taken into consideration, the calculations become cumbersome.

One object of this invention is to provide an integrating meter whose registration will be proportional at all loads to the losses within the transformer, and whose readings at desired time intervals will represent the energy losses in the transformer during the period.

Another object of the invention is to provide, in combination with a standard watthour meter, registering output of a transformer on the secondary side, a means of recording electrical input to the primary side. The latter object is prompted by the limitations of present commercial watthour meters when installed on the primary side, in recording accurately the energy losses in transformers at times of no load or when the load on the transformer is small. Since the transformer losses are usually of the order of from 1 to 2% of the full load rating, commercial watthour meters suitable for measuring the total load may record the losses alone with considerable error.

A third object of the invention is to make possible and commercially practical the increased factor of safety which is obtainable from low-tension metering equipment as compared to metering on the high-tension side. Particularly in the smaller current ratings, high-tension current transformers of the accuracy requirements suitable for metering have thermal and mechanical limits which are less than those of other equipment installed at equally exposed locations on transmission and distribution systems.

In practising the invention use is made of the principle of the induction watthour meter. For purposes of measurement, the losses are considered in two parts, viz: (1) copper losses, which vary with the square of the load current, and (2) iron losses, which vary with the square of the applied voltage.

For a further exposition of my invention reference may be had to the annexed drawings and specification at the end whereof my invention will be specifically pointed out and claimed.

In the drawings,

Figure 1 is a diagram showing one form of my novel meter and the circuit connections thereto.

Figure 2 is a circuit diagram showing the application of my meter to an open delta transformer bank.

Figure 3 is a circuit diagram showing the connection of my meter to current and potential transformers on a single phase circuit.

Figure 4 is a circuit diagram showing the application of my meter to three phase, four wire circuits.

Figure 5 is a single line diagram showing the application of my meter to metering at a point remote from the actual metering installation.

Figure 6:
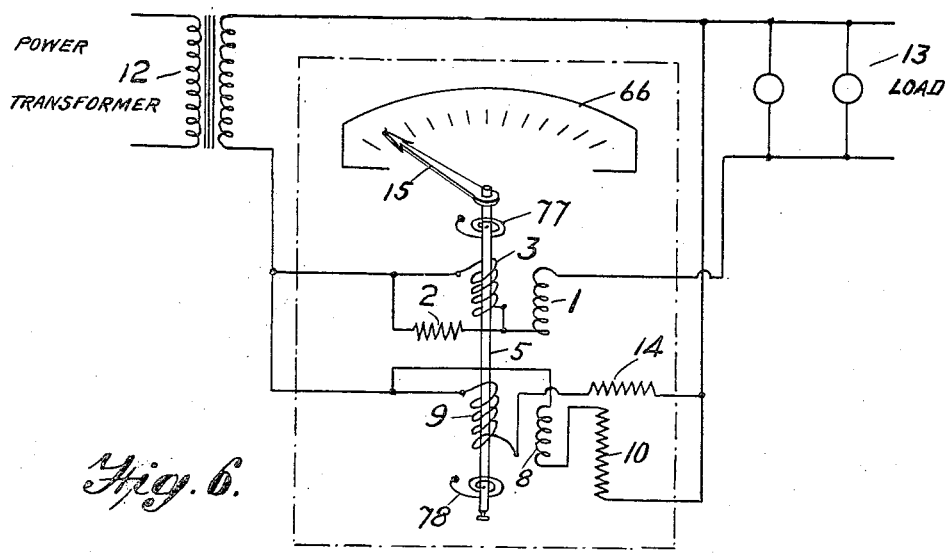
Figure 6 is a diagrammatic view showing my invention as applied to an indicating meter.

For the measurement of copper losses the principle of the ampere-square-hour meter is utilized, and with certain changes either element of a two-element induction watt hour meter may be adapted for this purpose. In Figure 1, the top element is arranged with a current coil 1 which consists of a number of turns of heavy wire connected in series with a resistor 2 which is in turn connected in series with the load current. The potential coil 3 also consists of a number of turns of heavy wire, and its terminals are connected across the terminals of resistor 2 which serves as a shunt. The magnetic effect of each coil is thus proportional to the load current, and their interaction will produce a torque on disk 4 which varies with the square of the load current.

The disk 4 is mounted on shaft 5 suitably geared to register 6 in accordance with the usual arrangement of watt hour meters, and one or more permanent magnets 7 serve to provide an adjustable retarding torque. The register gearing is advantageously, but not necessarily, chosen to record in ampere-square-hours, the reading is multiplied by a constant, and when the register is geared to read ampere-square-hours, the constant is equal to the equivalent effective resistance of the transformer in ohms.

The foregoing description applies to that part of the meter whose registration is proportional to the copper losses, and originality in regard to this part is claimed only in combination with the core-loss element described below.

The other element of the combination, the lower element in Figure 1 consists of a current electromagnet 8 and a potential electromagnet 9 operating on a second disk 44 connected to shaft 5. The potential electromagnet 9 is the standard potential coil as used in a watt hour meter designed for the voltage of the circuit to which the "compensating meter" is connected. The current electromagnet 8 may be a standard watt hour meter current coil, but it is advantageous to construct this coil of a larger number of turns, so that the full load speed of the lower element may be obtained with a current as small as 0.1 ampere or less. An adjustable resistor 10 is connected, either within the meter or externally, between the load terminal of current coil 8 and the opposite side of the line 11. The value in ohms of resistor 10 is adjusted on the basis of the magnitude of the core losses, the register ratio of the meter, and the current required to cause the lower element to record the true core losses on register 6 in connection with the constant established for the copper loss registration on the copper-loss element.

In practicing the invention it is evident that as soon as the transformer 12 is energized even though load 13 is not connected, the meter will immediately begin to record due to the torque produced by the lower element, and the amount of registration will depend upon the magnitude of the core losses and the time that the transformer is energized. If now load 13 is connected in circuit the upper element will add a torque in proportion to the copper losses and the total losses will be integrated with respect to time on register 6. Variations in load 13 vary the torque added by the copper-loss element automatically, and the resultant registration of the meter as a whole will be proportional to the transformer losses over a desired period of time.

Variations in general design and arrangement of the various parts are possible and this invention includes the application of the principles involved with respect to all types of integrating induction meters. Resistors 2 and/or 10 may be within the case of the meter or may be mounted and connected externally. Register 6 may be of the cyclometer type if desired, and while Figure 1 shows two permanent magnets per element, the invention is equally applicable for single magnet construction, or with the omission of the magnet or magnets from either element.

The electric loss meter serves also for the measurement of the maximum loss demand. This is accomplished by replacing register 6 with a standard watthour demand register, by adding contacts for the operation of a separate demand meter, or by adding a graphic demand mechanism. No originality is claimed for these accessories, and they are cited only to indicate their part in the system of measurement described herein.

Alternative arrangements and connections to those shown in detail in Figure 1 are possible, and it is intended to include any other connections and meter arrangements which permit the combination of a " current squared " element and a " voltage squared " element on a single shaft and/or driving a single register.

Figure 8:
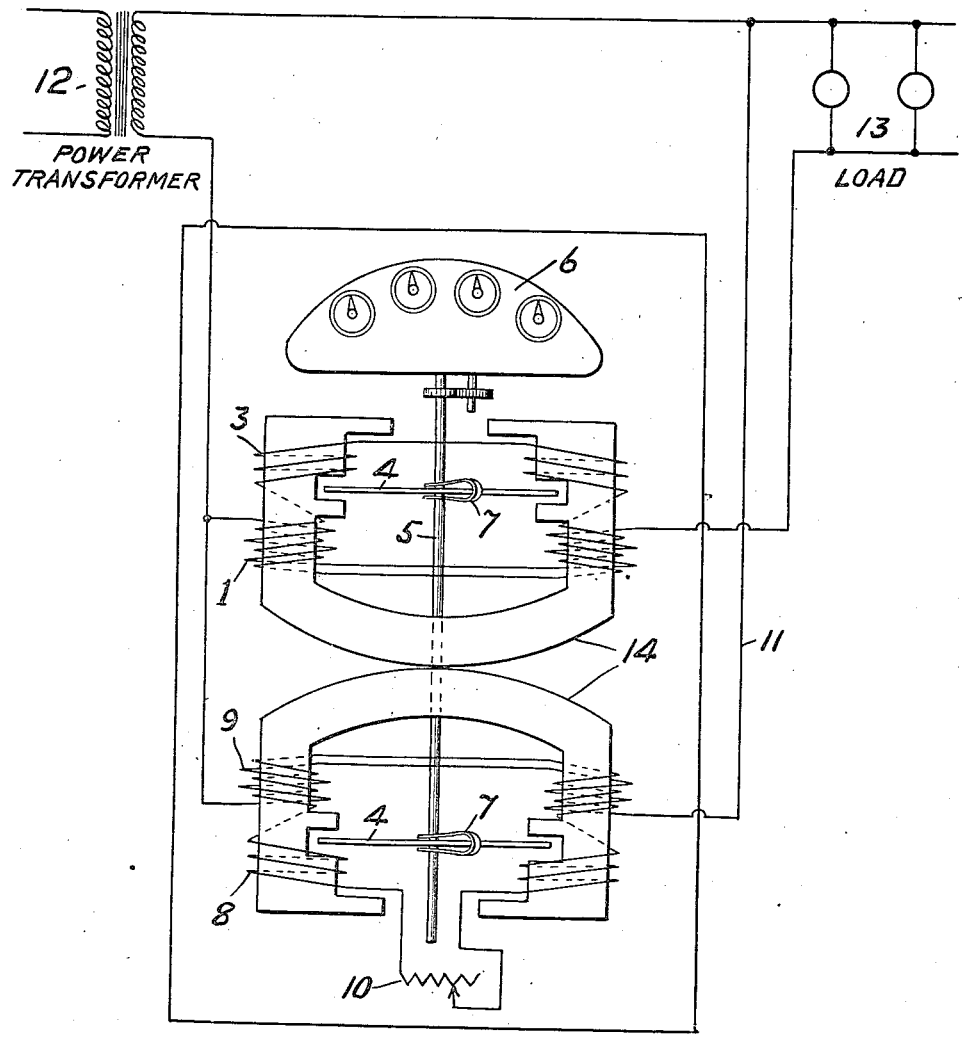
Figure 8 is a diagrammatic view showing a modification.

In Figure 8, the copper loss element (shown as the top element) consists of a primary coil 1 wound of heavy wire upon a suitable core 14, and connected in series with the load 13. On the same core is wound a closed secondary coil 3, and both coils are arranged so that the fluxes produced by each co-act on disk 4 to produce a torque proportional to the square of the current.

The core loss element (shown as the lower element) is similarly designed, but is constructed of many turns of fine wire. The primary coil 9 is connected across the line, and the secondary coil 8 forms a closed circuit through resistor 10, which serves as the core loss adjustment for the meter.

Calibration of the meter is effected in two operations. The copper-loss element is checked with an ammeter and adjustment is possible by adjusting the retarding torque of the permanent magnets on either or both elements of the meter. The core loss element should be excited at normal voltage during this test, and its effect is subtracted from the total to determine the accuracy of the copper-loss element.

The constant for the meter is the equivalent effective resistance of the transformer and is determined from copper loss tests on the transformer. The constant may be included wholly or in part in the register ratio, and the register reading with its multiplier will then be in kilowatt-hours.

The original adjustment of the core-loss element is by adjusting resistor 10 so that the registration on the register will represent the kilowatt-hours due to core loss, the value of which has been determined from tests on the transformer. Subsequent checks require only the timing of the disk to verify that no changes in calibration have occurred.

The compensating meter may be connected to the secondaries of instrument transformers when the characteristics of the circuit make this procedure advisable. Figure 3 serves as an example of this connection and shows the compensating meter connected to current and potential transformers on a single phase circuit.

Certain refinements are possible when it is desired to obtain precision accuracy of performance, in which case the resistors 10 and 2 may be made of suitable metals so that their temperature coefficients will introduce the desired variables to compensate for changes in transformer temperatures, and for specific installations it is possible to make the register direct-reading by including the constant in the register ratio.

The invention is shown in Figure 1 in the single-phase form, suitable for measuring the losses of a single transformer or the total losses on polyphase transformer banks carrying balanced loads and operating at balanced voltages. On unbalanced polyphase circuits duplicates of the combination shown may be provided, or the several combinations may be combined in a multi-element meter, either with two shafts and a differential register, or a single shaft. Figure 2 shows two compensating meters on an open delta connected transformer bank, and these two meters may be combined into a four-element meter. Losses for unbalanced three-phase four-wire transformer banks may be measured by three single-phase compensating meters Figure 4 or their polyphase equivalent. On polyphase circuits on which the voltages are balanced it is possible to use a single core-loss element in combination with two copper-loss elements for two or three phase three-wire circuits; or a single core-loss element with three copper-loss elements on three-phase four-wire circuits.

Copper losses in transmission lines to a specified point may be included in the meter registration by adding the line resistance to that of the transformer in determining the constant for the meter. It is thus possible to obtain values of energy consumption at a point remote from the point at which the meters are installed. Figure 5 shows an example of conditions where this procedure is advantageous.

The foregoing description covers the compensating meter and its application to the measurement of integrated energy losses in transformers. The meter is equally applicable, however, to the measurement of reactive kilovolt-amperes or of kilovolt-amperes coincident with the transformer losses. This is possible by changing the value of resistor 10, and by using as a multiplying constant the effective equivalent reactance and impedance for measuring reactive kvah. and kvah., respectively.

The application of the principles involved is possible also with an indicating or graphic instrument by combining on a single shaft an element whose torque is proportional to the square of the current, with an element whose torque is proportional to the square of the voltage. These elements may be either of the thermal, induction, or of the dynamometer type. When these elements are combined in an indicating or graphic instrument, the retarding torque is supplied by the conventional retarding springs in place of magnets 7 and a pointer, pen or stylus moving over a scale or chart replaces register 6. Examples of these applications of the principles involved are shown in Figures 6 and 7.

In Figure 6 there is disclosed an embodiment of my invention as applied to an indicating or graphic meter. As shown the instrument consists of a shaft 5 having at one end thereof a pointer 15 adapted to cooperate with a scale 66. Mounted on shaft 5 is a potential coil 3 having in parallel therewith a resistor 2. In series with coil 3 and with resistor 2 and cooperating with coil 3 is a current coil 1. Also mounted on shaft 5 is a potential coil 9 having in series therewith a resistor 14. Connected in parallel with coil 9 and resistor 14 is a fixed current coil 8 and a calibrating resistor 10 therefor. Coil 8 is arranged adjacent coil 9 to cooperate therewith. Current is led to movable coils 3 and 9 in any convenient manner as by brushes or collector rings not shown. Also attached to shaft 5 are retarding springs 77 and 78 so attached to shaft 5 as to oppose the torque created on the shaft by the operation of coils 1 and 3 and coils 8 and 9. It will thus be seen that coils 1 and 3 form an element whose torque is proportional to the square of the current while coils 8 and 9 form an element whose torque is proportional to the square of the voltage.

Figure 7:
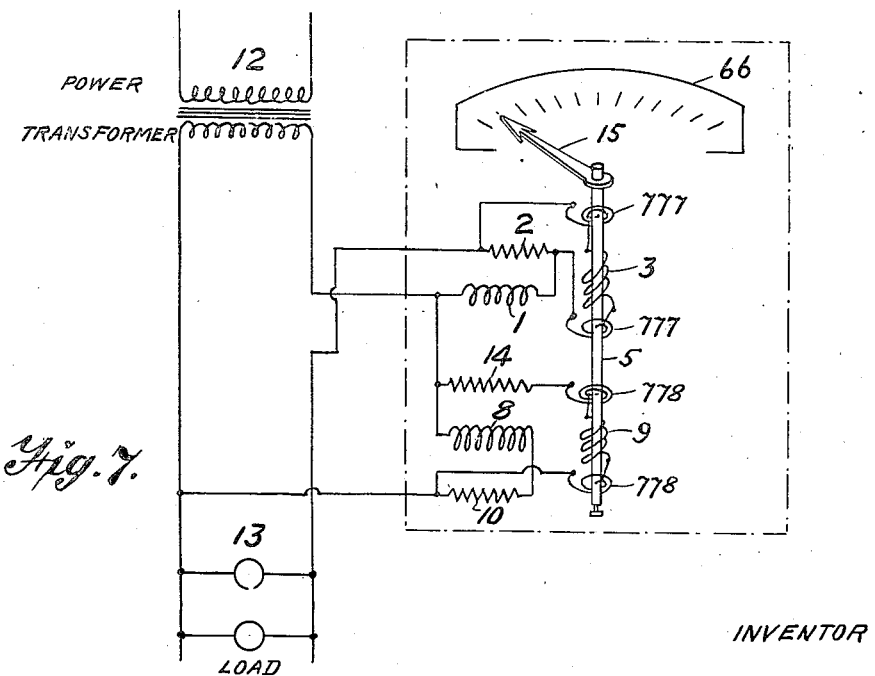
Figure 7 is a diagrammatic view showing a modified form of indicating meter.

In Figure 7 is shown a modified form of indicating instrument similar to that described in conjunction with Figure 6 but in which the retarding springs 777 serve to conduct the current to the movable potential coil 3 and in which the retarding springs 778 serve to conduct the current whose voltage is to be measured to the movable potential coil 9. There is thus provided an indicating instrument similar to that described in connection with Figure 6.

I do not intend to be limited in the practice of my invention save as the scope of the prior art and of the attached claims may require.

I claim:

1. In an electric system, the combination of a transformer, an electric meter for measuring losses in the transformer, said meter including in combination means for measuring the power lost in the transformer, a shaft for driving said means, a disk attached to said shaft, a coil in operative relation to said disk through which coil a current proportional to the current of said transformer passes, a second coil in series with said first coil and in operative relation to said disk, a resistor in parallel with said second coil to introduce a phase displacement between the effects of the two coils on said disk, the effect of said coils on said disk being proportional to the square of the current of the transformer, a second disk on said shaft, a third coil in operative relation to said second disk and responsive to the voltage of said transformer, a fourth coil in operative relation to said second disk, and a second resistor connected in series with said fourth coil across said transformer, the effect of said third and fourth coils on said second disk being proportional to the square of the voltage of said transformer.

2. In an electric system, the combination of a transformer, an electric meter for measuring losses in the transformer, said meter including in combination means for measuring the power lost in the transformer, a shaft for driving said means, a disk attached to said shaft, a coil in operative relation to said disk through which coil a current proportional to the current of said transformer passes, a second coil in series with said first coil and in operative relation to said disk, a resistor in parallel with said second coil to introduce a phase displacement between the effects of the two coils on said disk, the effect of said coils on said disk being proportional to the square of the current of the transformer, and second means for actuating said first mentioned means proportionally to the square of the voltage of said transformer.

3. In an electric system, the combination of a transformer, an electric meter for measuring the losses of said transformer, said meter comprising in combination means for indicating the integrated energy losses in said transformer, a shaft for driving said means, a disk attached to said shaft, a coil in operative relation to said disk through which coil a current proportional to the current of said transformer passes, a second coil in series with said first coil and in operative relation to said disk, a resistor in parallel with said second coil to introduce a phase displacement between the effects of the two coils on said disk, the effect of said coils on said disk being proportional to the square of the current of the transformer, a second disk on said shaft, a third coil in operative relation to said second disk and responsive to the voltage of said transformer, a fourth coil in operative relation to said second disk, and a second resistor connected in series with said fourth coil across said transformer, the effect of said third and fourth coils on said second disk being proportional to the square of the voltage of said transformer, and means for adjusting the effective torques of said elements to desired values.

4. In an electric system the combination of a transformer, an electric meter for measuring the losses of said transformer, said meter comprising in combination means for indicating the integrated energy losses in said transformer, a shaft for driving said means, a disk attached to said shaft, a coil in operative relation to said disk through which coil a current proportional to the current of said transformer passes, a second coil in series with said first coil and in operative relation to said disk, a resistor in parallel with said second coil to introduce a phase displacement between the effects of the two coils on said disk, the effect of said coils on said disk being proportional to the square of the current of the transformer, and second means for actuating said first mentioned means proportionally to the square of the voltage of said transformer, and means for adjusting the effective torques of said elements to desired values.

5. In an electric system, the combination of a transformer, an electric instrument, said instrument including the combination of an ampere squared element consisting of a fixed coil and a movable coil, each of said coils connected in circuit so that the currents through them are proportional to the current in the transformer, means for adjusting the relative torques of said coils in accordance with predetermined copper losses of said transformer, a shaft carrying said movable coil, a pointer actuated by said shaft and moving over a scale, retarding springs opposing the movement of said shaft, a voltage squared element consisting of a fixed coil and a movable coil attached to said shaft, each of said coils connected in circuit so that the currents through them are each proportional to the voltage of said transformer, and means for adjusting said voltage squared element and said ampere squared element in accordance with predetermined core and copper losses of said transformer.

6. In an electric instrument, the combination of an element comprising, two coils connected in circuit so that the current of each is proportional to the same current, an element cooperating with said first mentioned element and comprising two coils connected in circuit so that the current of each is proportional to the same voltage, means for calibrating said current element and voltage element, and means for measuring the combined effect of said elements.

7. In an electric system, the combination of a transformer, an electric meter for measuring the transformer losses comprising in combination, means for integrating the losses in said transformer, a shaft for driving said means, a disk attached to said shaft, a coil through which a current proportional to the current of said transformer passes, a second coil arranged in operative relation to said first mentioned coil and through which a current proportional to the current in the first coil passes, said first and second coils arranged in operative relation to said disk, the effect of said coils on said disk being proportional to the square of the current in said transformer, a second disk on said shaft, a third coil responsive to the voltage of said transformer, a fourth coil arranged in operative relation to said third coil and through which a current proportional to the current in the third coil passes, said third and fourth coils arranged in operative relation to said second disk, the effect of said third and fourth coils on said second disk being proportional to the square of the voltage of said transformer, and means for calibrating the current and voltage elements in accordance with core and copper losses of said transformer.

8. In an electric system, the combination of a transformer, an electric watt hour meter connected to measure the load of said transformer, an electric ampere-square-hour meter connected in circuit with said transformer, a voltage-square-hour meter comprising an induction meter element including in combination, means for integrating the core losses in said transformer, a shaft for driving said means, a disk attached to said shaft, a coil connected to be responsive to the voltage of said transformer and arranged in operative relation to said disk, a second coil connected to be responsive to the voltage of said transformer and arranged in operative relation to said disk, the effect of said coils being proportional to the square of the voltage of said transformer, and means for calibrating said voltage-square-hour meter in accordance with the core losses of said transformer.

9. In an electric system, the combination of a transformer, an electric watt hour meter connected to measure the load of said transformer, an electric ampere-square-hour meter connected in circuit with said transformer, a voltage-square-hour meter comprising an induction meter element including in combination, means for integrating the core losses in said transformer, a shaft for driving said means, a disk attached to said shaft, a coil connected to be responsive to the voltage of said transformer and arranged in operative relation to a second coil through which a current proportional to the current of said first coil passes, said coils arranged in operative relation to said disk whose torque is proportional to the square of the voltage of said transformer, and means for calibrating said voltage-square-hour meter in accordance with the core losses of said transformer.

10. In an electric system, the combination of a transformer, an electric instrument for measuring losses in said transformer, an ampere-squared element in said instrument, a voltage squared element in said instrument, means for calibrating said elements in accordance with predetermined losses in said transformer, second means which connects and which is actuated by said elements, third means actuated by said second means for measuring said first transformer losses, and means for measuring the load on said transformer.

11. An electric instrument for measuring electrical losses, an ampere-squared element in said instrument, a voltage-squared element in said instrument, means for calibrating said elements in accordance with predetermined losses, second means which connects and which is actuated by said elements, and third means actuated by said second means for measuring said losses.

12. An electric instrument for measuring losses, an ampere-squared element in said instrument, a voltage-squared element in said instrument, means for calibrating said elements in accordance with predetermined losses, second means which connects and which is actuated by said elements, third means actuated by said second means for measuring said losses, and means for indicating the maximum demand of the integrated losses over a desired time interval.

13. An electric instrument for measuring losses, an ampere-squared element in said instrument, a voltage-squared element in said instrument, means for calibrating said elements in accordance with predetermined losses, second means which connects and which is actuated by said elements, third means actuated by said second means for measuring said losses, and means for recording the integrated loss demands at desired time intervals.

14. A process of electrical measuring which consists of the following steps, simultaneously measuring the core losses and the copper losses of a transformer, and simultaneously with said measurements combining said measurements.

15. A process of electrical measuring, which process consists of the following steps, simultaneously measuring the voltage-squared loss and the current squared loss in an electric system, and simultaneously with said measurements combining said measurements.

16. In an electric system the combination of a transformer, an electric instrument for measuring losses in said transformer, an ampere squared element in said instrument, a voltage squared element in said instrument, means for calibrating said elements in accordance with predetermined losses in said transformer, means which connects and which is actuated by said elements, and means actuated by said last mentioned means for measuring said transformer losses.

17. In the combination according to claim 16, a watthour meter connected to said transformer to measure the load on said transformer.

GEORGE B. SCHLEICHER.